No. 733,798. PATENTED JULY 14, 1903.
O. BEHNKE.
FLUID PRESSURE BRAKE FOR GUNS.
APPLICATION FILED OCT. 6, 1902.
NO MODEL. 2 SHEETS—SHEET 1.
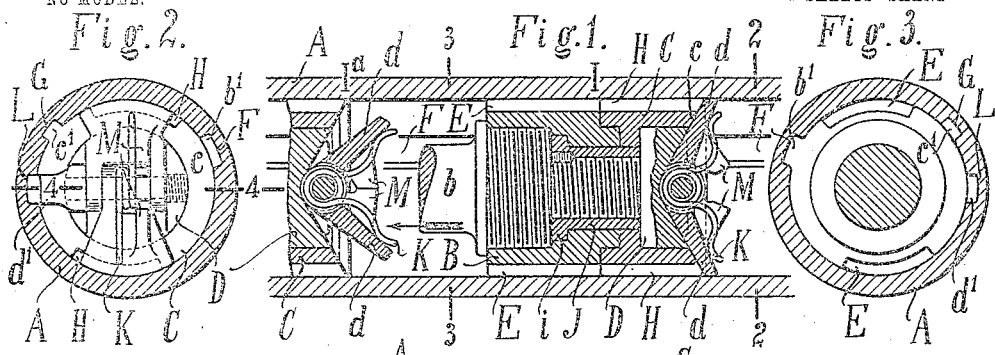
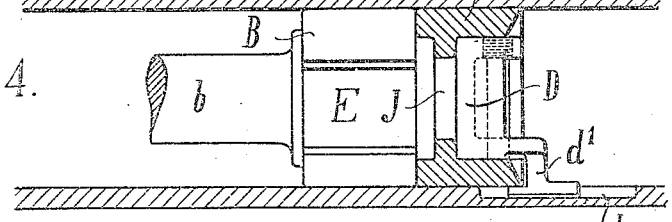
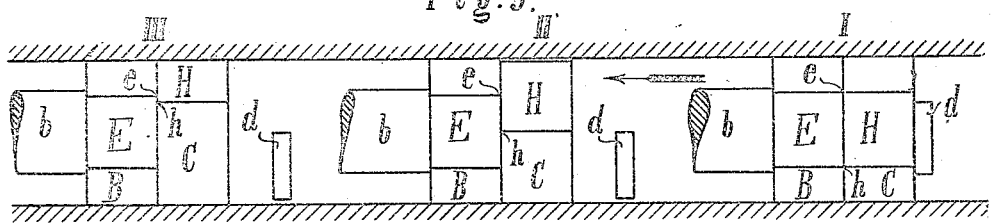
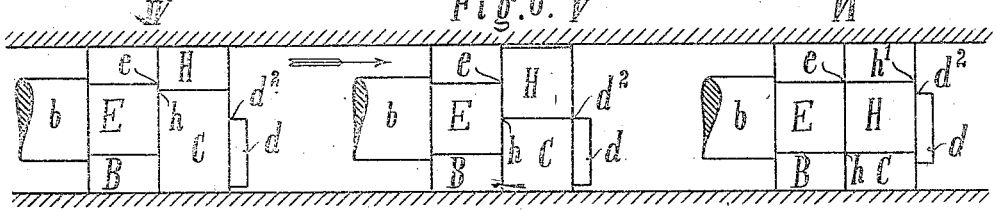
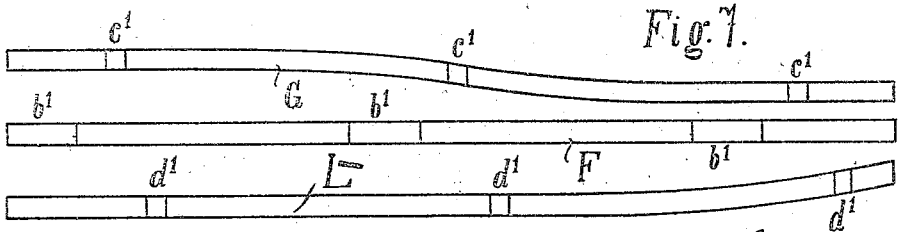

No. 733,798. PATENTED JULY 14, 1903.
O. BEHNKE.
FLUID PRESSURE BRAKE FOR GUNS.
APPLICATION FILED OCT. 6, 1902.
NO MODEL. 2 SHEETS—SHEET 2.

No. 733,798. Patented July 14, 1903.

UNITED STATES PATENT OFFICE.

OTTO BEHNKE, OF ESSEN-ON-THE-RUHR, GERMANY, ASSIGNOR TO FRIED. KRUPP, OF ESSEN-ON-THE-RUHR, GERMANY.

FLUID-PRESSURE BRAKE FOR GUNS.

SPECIFICATION forming part of Letters Patent No. 733,798, dated July 14, 1903.

Application filed October 6, 1902. Serial No. 126,243. (No model.)

*To all whom it may concern:*

Be it known that I, OTTO BEHNKE, a subject of the Emperor of Germany, and a resident of 36 Bismarckstrasse, Essen-on-the-Ruhr, Germany, have invented certain new and useful Improvements in Fluid-Pressure Brakes for Guns, of which the following is a specification.

This invention relates to fluid-pressure brakes for guns in which the fluid in the brake-cylinder is forced from one side of the brake-piston to the other during the recoil and running-out movements of the piston. The passage of the fluid in brakes of this character takes place either through grooves formed in the inner wall of the cylinder or the mantle-face of the piston or through bores located in the body of the piston.

The invention relates specifically to a device for regulating the running-out movement in these fluid-pressure brakes; and it consists in arranging on the brake-piston a clap-valve rotatable about the axis of the piston and forced to rotate relatively to the piston during the movement of the latter.

Figure 9:
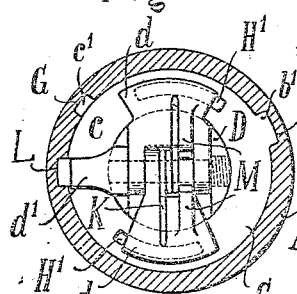
Figure 8:
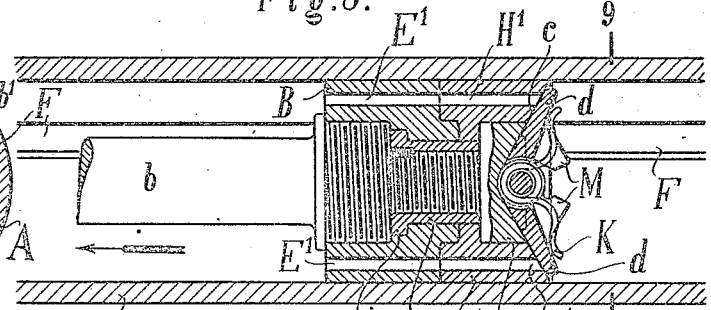
Figure 11:
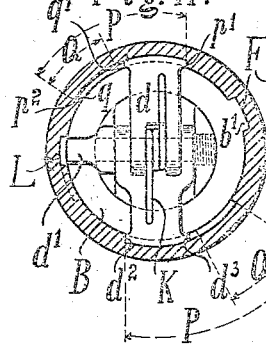
Figure 10:
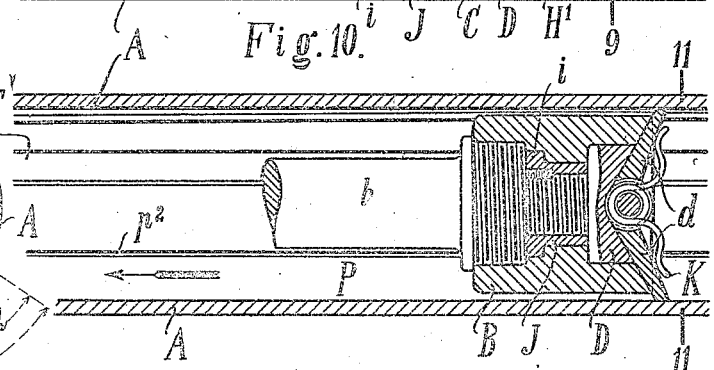
Figure 12:
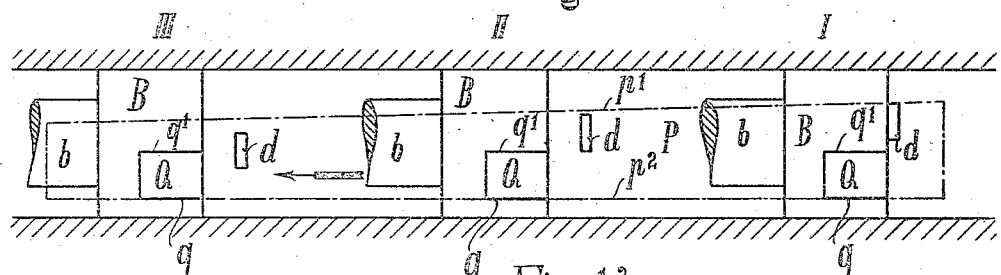
Figure 13:
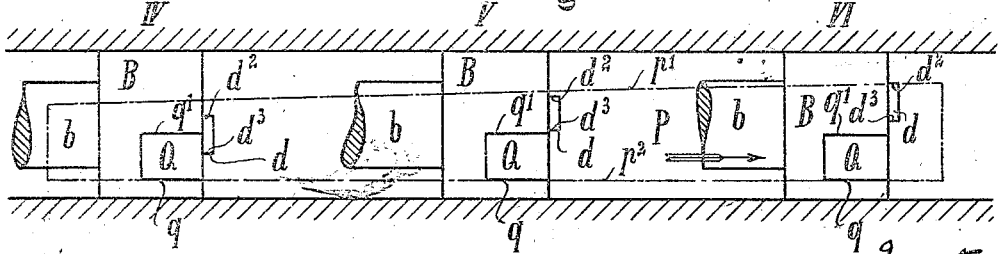

In the accompanying drawings, which illustrate three embodiments of the invention, Figure 1 shows in longitudinal section an embodiment of the invention designed for fluid-pressure brakes in which the passage of the fluid takes place through grooves formed in the mantle of the piston. Fig. 2 is a cross-section on the line 2 2, Fig. 1, looking from the right. Fig. 3 is a cross-section on the line 3 3, Fig. 1, looking from the left. Fig. 4 is a section on the line 4 4, Fig. 2, with the clap-valve removed, several parts being in elevation. Figs. 5, 6, and 7 are schematic illustrations. Fig. 8 shows in longitudinal section a second embodiment of the invention designed for fluid-pressure brakes in which the fluid passes from one side of the piston to the other through bores arranged in the piston. Fig. 9 is a section on the line 9 9, Fig. 8, looking from the right. Fig. 10 shows a third embodiment of the invention designed for fluid-pressure brakes in which the fluid passes from one side of the piston to the other through grooves cut in the wall of the cylinder. Fig. 11 is a section on the line 11 11, Fig. 10, looking from the right. Figs. 12 and 13 are schematic illustrations explanatory of that embodiment of the invention which is shown in Figs. 10 and 11.

Referring to the embodiment shown in Figs. 1 to 7, inclusive, the brake-piston consists, essentially, of three parts—namely, a piston-body B, fixedly connected with the piston-rod, a rotary valve C, and a clap-valve D *d* J. The piston B is provided on its mantle-surface with a projection *b'*, Fig. 3, which is guided in a right-line groove F in the wall of the brake-cylinder, so that the piston-body B is secured against turning in recoil and running-out movements. (See also Fig. 7.)

In the mantle-surface of the piston-body B are cut two diametrically opposite right-line by-pass grooves E. The piston-body B is offset upon the side opposite to the piston-rod and carries at this point the rotary valve C, which is provided on its mantle-face with a projection *c'*, Fig. 2. This projection *c'* is so guided in a curved groove G of the cylinder-wall that it turns the rotary valve C during the recoil and running-out movements of the piston-body B. In the mantle-face of the rotary valve C are likewise cut two diametrically opposite right-line by-pass grooves H, which have the same breadth and depth as the grooves E in the piston-body B. In a bore of the piston-body B is rotatably arranged a box J, with a shoulder *i*, which box projects through the bore of the rotary valve. Securely connected to this box J through the medium of screw-threads is a valve-block D, rotatably mounted in the bore of the rotary valve C, which valve-block may turn relatively to the piston-body B and independently of the rotary valve C and, together with the shoulder *i* of the box J, connects the rotary valve C with the piston-body B, so that it is immovable in an axial direction, but rotatable thereon. Upon the valve-block D are hinged two clappers *d*, of essentially sector shape, which at their periphery are about equal in width to the grooves E and H. The rotary valve C is formed on the side away from the piston-rod *b* with a cone face *c*, against which the correspondingly-formed faces of the clappers *d* are pressed by the free ends of the torsion-spring K, wound upon the pivot-bolt of the clappers. The valve-block D is provided with a lateral extension $d'$, Fig. 2, which engages in a curved groove L, cut into the wall of the cylinder, and adapted to turn the valve relatively to the piston-body during the movement of the brake-piston. The portion of the extension $d'$ which engages in the groove L is of such a length that it engages in that portion of the groove L which is covered by the mantle-surface of the rotary valve, and thus closes the rotary valve against the passage of fluid. The stroke of the clappers is limited by two stops M, arranged upon them, which abut against each other when the valves are open.

The brake-cylinder is filled with fluid on both sides of the piston.

The description of the mode of operation of the subject-matter of this invention will proceed from those positions of the parts of the brake-piston under consideration assumed in the firing position of the gun—namely, the position indicated at I in Fig. 1 and in Fig. 5. In this position the by-pass grooves E and H coincide, and the clappers $d$ lie against the cone face $c$ of the rotary valve C and cover the by-pass groove H, with the exception of a restricted portion. When a shot is fired, the brake-piston moves back in the direction of the black-feathered arrows, Figs. 1 and 5, and seeks to expel the fluid in front of it to the other side of the piston. The overflowing fluid escapes through the by-pass grooves E and H of the piston-body and of the rotary valve and unseats the clappers $d$ in opposition to the pressure of the ends of the spring K. The clappers $d$ in consequence of the hollow conical form of their seat $c$ immediately open and form a by-pass upon the commencement of recoil and during the continuance of recoil retain this position, which is illustrated at $I^a$ in Fig. 1. Consequently they have no influence upon the recoil. This last-mentioned fact is not affected by the rotation of the valve-block D about the axis of the brake-piston relatively to the piston-body and the rotary valve by the engagement of the projection $d'$ of said valve-block in the groove L of the cylinder-wall during such recoil movement. Since, as already noted, the by-pass grooves E and H coincide at the beginning of recoil movement, (Fig. 5, position I,) the brake fluid, while the first part of the recoil is only slightly throttled, can pass from one side of the piston to the other. In the further continuance of the recoil the rotary valve C will be forced by its guiding extension $c'$ to turn relatively to the piston-body B to a degree corresponding to the curve of its guiding-groove G, (illustrated, by way of example, in Fig. 7,) so that the edge $h$ of the rotary valve, together with the edge $e$ of the piston-body, (Fig. 5, position II,) continually reduces the by-pass opening, with a progressive increase of throttling of the fluid, so that at the end of recoil (Fig. 5, position III) only a very small by-pass opening remains between the edges $e$ and $h$. The recoil having ceased, the piston is driven forward in the direction of the light-feathered arrows, Fig. 6, by means of the energy stored up in the recuperator-spring or the like during recoil. As soon as this reversal of movement commences the valve-clappers $d$ are seated upon the cone face $c$ of the rotary valve under the influence of the ends of the spring K and the now reversed flow of fluid and remain in this seated position until the end of the running-out movement. (Fig. 6, positions IV, V, VI.) During the running-out movement the rotary valve C is always returned to its original position through the medium of its projection $c'$, sliding in the groove G. The clap-valve D $d$ J does not change its position with reference to the piston-body during the first part of the running-out movement, since the guide-groove L for the projection $d'$ of the valve runs in a right line for a part of its length, Fig. 7. As will be observed from Fig. 6, (positions IV and V,) only the edges $e$ and $h$ of the piston-body B and the rotary valve C now influence the throttling of the flowing liquid. At the commencement of the position V of the brake-piston (shown in Fig. 6) the edges $d^2$ of the clappers $d$ influence the sectional area of the by-pass. Next, the further throttling of the fluid, as will be seen from Fig. 6, position VI, is so affected by the edges $h'$ and $d^2$ of the rotary valve C and the clappers $d$ that toward the end of the running-out movement a material restriction of the by-pass opening, and consequently a more gradual movement, is produced.

Guiding-grooves F, G, and L can naturally follow other curves than that illustrated in Fig. 7 and suitable to the effect which it is desired to be produced by them.

The embodiment of the invention shown in Figs. 8 and 9 differs from that above described, obviously, in that in place of the by-pass grooves E and H, cut into the wall of the piston, diametrically opposite by-pass bores E' and H', of segmental form, are arranged in the piston-body and rotary valve, through which the fluid flows during recoil and running-out movements. The operation of the parts of this embodiment is the same as described with reference to the illustration of the invention already given.

In the embodiment of the invention shown in Figs. 10 to 13 the braking fluid passes during recoil and running-out movements of the gun through two diametrically opposite by-pass grooves P, cut into the cylinder-wall, the depth of which is constant, while the breadth gradually decreases in the direction of the black-feathered arrow, Figs. 10 and 12. The reduction of the breadth of the grooves P is accomplished by having one of the side walls $p^2$ extend in a right line, while the other side wall $p'$ takes the direction of a spiral line. In engagement with the grooves P are two extensions Q of the piston-body B. During the recoil and running-out movements of the brake-piston the extensions Q are forced, through the medium of an extension $b'$, likewise arranged on the piston-body B and sliding in a right-line groove G of the brake-cylinder, to move with their edges $q$ bearing against the right-line edges $p^2$ of the by-pass grooves P. As the extensions Q are not so wide as the grooves P, a portion of the section of said grooves remains free during the movement of the brake-piston, which during recoil serves as a by-pass for the fluid, with a gradually-reducing section. In order now to cut off the greater portion of this by-pass section during the running-out movement, the clap-valve D $d$ J is arranged to rotate relatively to the piston-body in a manner similar to the two embodiments already described. The clappers $d$ engage, like the extensions Q of the piston-body, in the groove P of the cylinder-wall. The valve-block D is likewise provided with a lateral offset $d'$, which is guided in a spiral groove L, which forces the clap-valve to turn relatively to the piston-body during the recoil and running-out movements.

In the position of rest the several parts of the brake-piston take the positions shown in Figs. 10 and 11 and at I in Fig. 12. As soon as the recoil of the brake-piston begins the clappers $d$ are raised from their seat against the pressure of their spring K by the pressure of the fluid streaming through the grooves P, (Fig. 12, positions II and III,) and they retain this raised position until the end of the recoil. Consequently the brake fluid can pass from one side of the piston to the other through the space between the side wall $p'$ of the by-pass grooves and the side walls $q'$ of the extension Q, whereby it nevertheless meets with a throttling due to the restriction in the breadth of the by-pass section. During the recoil movement of the brake-piston the clap-valve was positively turned relatively to the piston-body by the offset $d'$ sliding in the curved groove L, without, however, influencing the by-pass of the fluid, since the clappers $d$ are raised from the piston-body; but as soon as the running-out movement in the direction of the light-feathered arrow, Fig. 13, begins the clappers $d$ are seated under the pressure of the spring K and of the fluid, so that during the running-out movement the ends of the clappers $d$ engaging in the grooves P of the extensions Q of the piston-body almost completely fill up the grooves P and by forcible throttling of the braking fluid produce a gradual running-out movement of the parts of the gun that are returning to firing position. During the running-out movement the clap-valve by reason of its offset $d'$ sliding in the curved groove L will be again forced to turn back—that is to say, this clap-valve turns, as shown in positions IV to VI, Fig. 13, to such a degree, for example, that at the beginning of the running-out movement (position IV, Fig. 13) a comparatively large by-pass is provided between the side faces $d^2$ of the clappers and the side walls $p'$ of the grooves P, and at the ending of the running-out movement (position VI, Fig. 13) a correspondingly great opening between the side faces $d^3$ of the clappers and $q'$ of the extensions Q is provided. In the intermediate position (position V, Fig. 13) only very small by-pass openings are made on either side of the clappers, so that at this position a very strong throttling of the brake fluid takes place. The guiding-groove L can obviously turn in other directions.

Having thus described the invention, the following is what is claimed as new therein:

1. In a fluid-pressure brake for recoil-guns, the combination of a cylinder and its piston, by-passes through which fluid escapes from one side of the piston to the other, and means for throttling said by-passes, consisting of a hinged valve rotating about the piston's axis during recoil and running-out movements, and opening and closing the by-passes by such rotation and having clappers seating in one direction to close said by-passes and unseating in the opposite direction to open the by-passes.

2. In a fluid-pressure brake for recoil-guns, the combination of the cylinder and its piston, having by-passes through which fluid passes from one side of the piston to the other, a valve-body rotatable on the axis of the piston throttling the by-passes by its rotation, a spirally-constructed guide on the interior of the cylinder, engaged by the valve-body to cause the latter to rotate during recoil and running-out movements, and hinged valves on the valve-body seating under pressure in one direction, over parts of the areas of the by-passes to restrict the flow therethrough, and unseating by pressure in the opposite direction as explained.

3. In a fluid-pressure brake for recoil-guns, the combination of the brake-cylinder, the piston, the rotary valve rotatable about the axis of and relatively to the piston, by-passes throttled by the relative movement between the piston and rotary valve, a guide within the cylinder engaged by the rotary valve to cause rotation of the latter, and hinged valves seating against and unseating from the by-passes by pressure of fluid in opposite directions.

4. In a fluid-pressure brake for recoil-guns, the combination of the cylinder, the piston having by-passes, the rotary valve having by-passes, corresponding to those in the piston, and the valve-body having hinged valves seating over the by-passes in the rotary valve; said rotary valve and clap-valve being each rotatable independently of each other and of the piston and having each a guide-bearing within the cylinder which causes their rotation during recoil and running-out movements of the gun.

5. In a fluid-pressure brake for recoil-guns, the combination with the cylinder and its piston, having by-passes and a concave seat, of a plurality of hinged valves mounted on the concave seat over said by-passes.

6. In a fluid-brake, the combination with the piston provided with a by-pass, of means carried by the piston, provided with a by-pass, and movable relatively to the piston on recoil to gradually reduce the size of the by-pass formed by both by-passes and means for reducing the flow through said by-pass on the return movement.

7. In a fluid-brake, the combination with the piston provided with a by-pass, of a rotary valve carried by the piston, provided with a by-pass, and movable on recoil to gradually reduce the size of the by-pass formed by both by-passes and means for reducing the flow through said by-pass on the return movement.

8. In a fluid-brake, the combination with the piston provided with a by-pass, of a rotary device carried by the piston and provided with a by-pass, and means moving one of said parts to gradually decrease the size of the by-pass, formed by both by-passes on recoil and gradually increasing the size of said by-pass on the return movement of the gun and means for reducing the flow through said by-pass on the return movement.

9. In a fluid-brake in which the fluid passes from one side of the piston to the other through the same by-pass, a plurality of devices, some of which automatically gradually reduce the size of the by-pass in the direction of recoil while others automatically gradually reduce the size of the by-pass in the direction of the return.

10. In a fluid-brake, in which the fluid passes from one side of the piston to the other through the same by-pass in the piston, a plurality of devices, some of which automatically gradually reduce the size of the by-pass in the direction of the recoil, while others automatically gradually reduce the size of the by-pass in the direction of the return.

11. In a fluid-brake in which the fluid passes from one side of the piston to the other through a suitable by-pass, a plurality of rotary devices carried by the piston, some of which reduce the size of the by-pass in the direction of the recoil while others reduce the size in the direction of the return.

12. In a fluid-brake in which the fluid passes from one side of the piston to the other, a rotatable hinged valve carried by the piston.

The foregoing specification signed at Dusseldorf, Germany, this 30th day of September, 1902.

OTTO HEHNKE.

In presence of—
WILLIAM ESSENWEIN,
PETER HEBER.